May 16, 1967 P. THEVIS 3,319,883

CARRIAGE COUPLING ARRANGEMENT FOR A CALCULATOR

Filed April 29, 1965

3 Sheets-Sheet 1

INVENTOR
Paul Thevis
BY: Michael J. Striker
ATTORNEY

INVENTOR
Paul Thevis
BY:
Michael J. Striker
ATTORNEY

INVENTOR
Paul Thevis
BY
Michael J. Striker
ATTORNEY

United States Patent Office 3,319,883
Patented May 16, 1967

3,319,883

CARRIAGE COUPLING ARRANGEMENT FOR A CALCULATOR

Paul Thevis, Oberndorf, Germany, assignor to Olympia Werke A.G., Wilhelmshaven, Germany Filed Apr. 29, 1965, Ser. No. 452,027
Claims priority, application Germany, Oct. 24, 1964, O 10,464
20 Claims. (Cl. 235—60)

The present invention relates to a carriage coupling arrangement for a calculator, and more particularly to apparatus for coupling a pin carriage with a multiplication carriage and a multiplication register.

In ten key calculators which are adapted for carrying out multiplications, the multiplier is entered into the pin carriage, whereupon the multiplier key is depressed. An operational cycle is started, during which transfer means sense the positions of the set pins of the pin carriage, while the multiplier register is cleared. During the second half of the operational cycle, the multiplier is transferred to the multiplier register, and may be printed. Thereupon, the multiplicand is entered into the pin carriage, and a multiplication key is actuated. This causes first coupling of the multiplication carriage with the pin carriage, and then disengagement of the same. While pin carriage and multiplication carriage are coupled, they move together between operative ordinal positions, while the multiplication carriage senses the values stored in the multiplication register, and controls the calculator to perform the necessary multiplication operation. The orders of the multiplier stored in the ordinal storing elements of the multiplication register, determine the number of additive machine operations which constitute the multiplication.

Coupling arrangements for coupling the pin carriage and the multiplication register are known. However, the known arrangements serving this purpose require a great deal of space which is difficult to provide in compact desk calculators. Furthermore, the known coupling arrangements do not permit a relative movement between the pin carriage and the multiplication carriage since the orders of the multiplier are sensed in a direction transverse to the direction of movement of the coupled carriages.

It is one object of the invention to overcome these disadvantages of known coupling arrangements for coupling a multiplication carriage with a pin carriage, and to provide a coupling arrangement which permits a sensing of the multiplication register in the direction of movement of the coupled pin carriage and multiplication carriage.

Another object of the invention is to provide a coupling arrangement permitting the pin carriage to remain in the same position, while the multiplication carriage is shifted between an inoperative position permitting the turning of the register wheels of the multiplier register and a position coupled with the multiplier register for movement between operative positions together with the pin carriage.

Another object of the invention is to provide apparatus for first coupling a multiplication carriage with a multiplier register, and then coupling the multiplication carriage with a pin carriage for movement together.

With these objects in view, the present invention relates to a carriage coupling arrangement for a calculator. One embodiment of the invention comprises first carriage means, for example a multiplication carriage which cooperates with a multiplier register and is movable between an inoperative position permitting the entering of a value into the multiplier register and a sequence of operative positions coupled with the multiplier register; second carriage means, such as the pin carriage of a ten-key calculator, movable between a sequence of operative positions; coupling means connected with the first carriage means for movement and being in a disengaged position and in an engaged position connected with the second carriage means when the first carriage means is in the inoperative position and in one of the operative positions, respectively; and actuating means movable between first and second positions for moving the coupling means to the disengaged and engaged positions.

The coupling means in the engaged position thereof, connects the first and second carriage means for movement together. When the actuating means moves the coupling means between the disengaged and engaged positions and the first carriage means is moved from the inoperative position to an operative position, the second carriage means, namely the pin carriage, remains in the same operative position. When the coupling means arrives in the engaged position, the first carriage means is coupled to the second carriage means, and the two carriage means move together between the operative positions.

The first carriage means, namely the multiplication carriage, is held in the inoperative position spaced from the multiplier register, so that the ordinal storing elements of the same can be moved for entering the multiplier into the multiplier register.

In the preferred embodiment of the invention, a first coupling member is connected with the multiplication carriage for movement therewith and has a pin cooperating with a recess in a turnable actuating member shifted by reciprocating drive means. When the actuating member is shifted, it moves the coupling pin of the first coupling member into a corresponding recess of a second coupling member which has a plurality of ordinal recesses and moves with the pin carriage. In this engaged position of the first coupling member and the second coupling member, the pin carriage and the multiplication carriage are coupled for movement together.

Locking means are provided for locking the first and second coupling members in the engaged coupled position, and are automatically released at the end of the operation before the multiplication carriage is again moved from an operative position to the inoperative position spaced from the multiplier register.

The actuating member is mounted on a stationary support member for turning movement. The second coupling member has the coupling recesses along a circular peripheral portion, while the first coupling member includes a bar which is longitudinally shifted when the coupling pin thereon is displaced by the actuating member. Due to this fact, comparatively little space is required for the first coupling member.

The novel features which are considered as characteristic for the invention are set forth in particular in the appended claims. The invention itself, however, both as to its construction and its method of operation, together with additional objects and advantages thereof, will be best understood from the following description of specific embodiments when read in conection with the accompanying drawings, in which:

Figure 1:
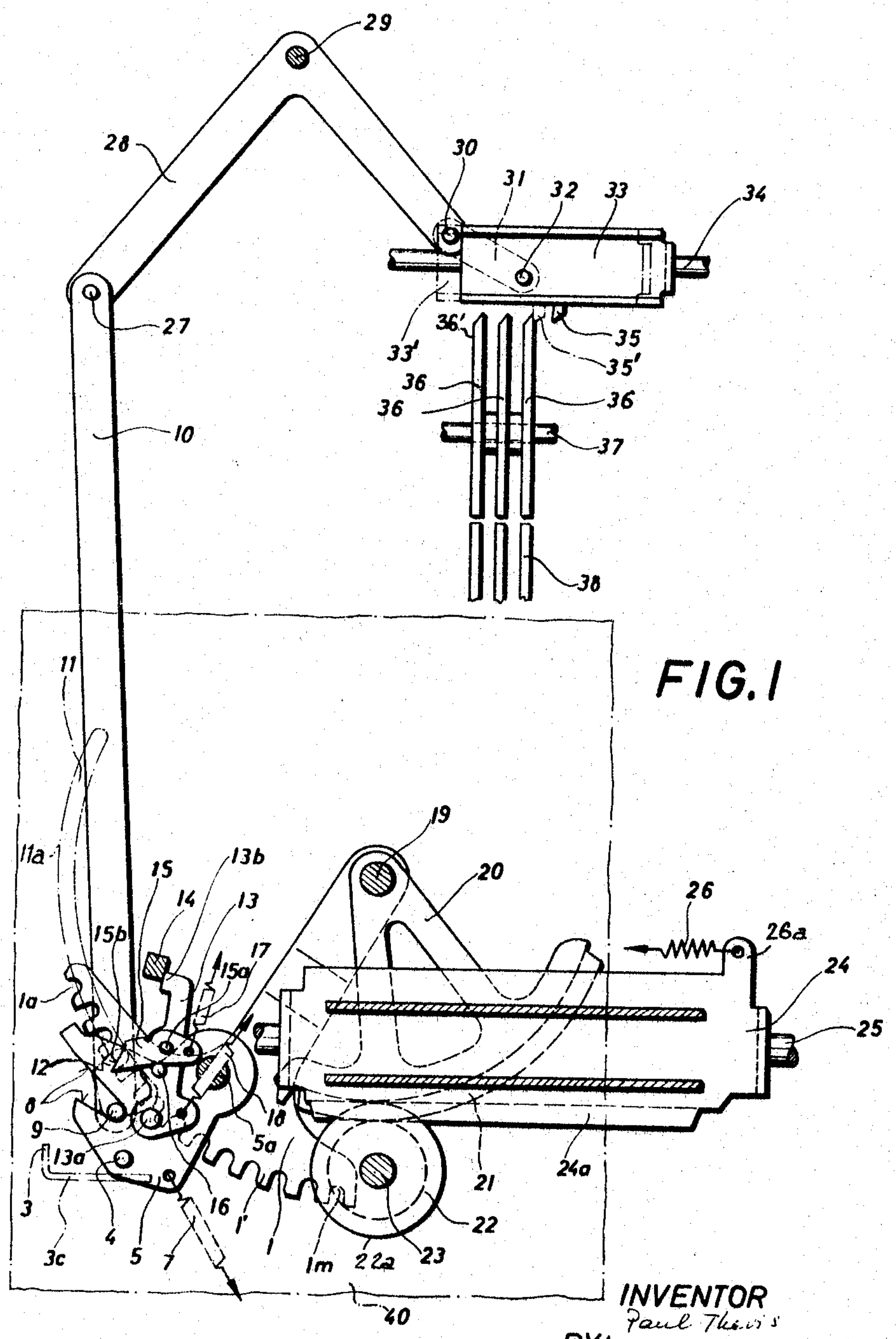
FIG. 1 is a fragmentary schematic plan view illustrating a coupling arrangement according to one embodiment of the invention.
Figure 3:
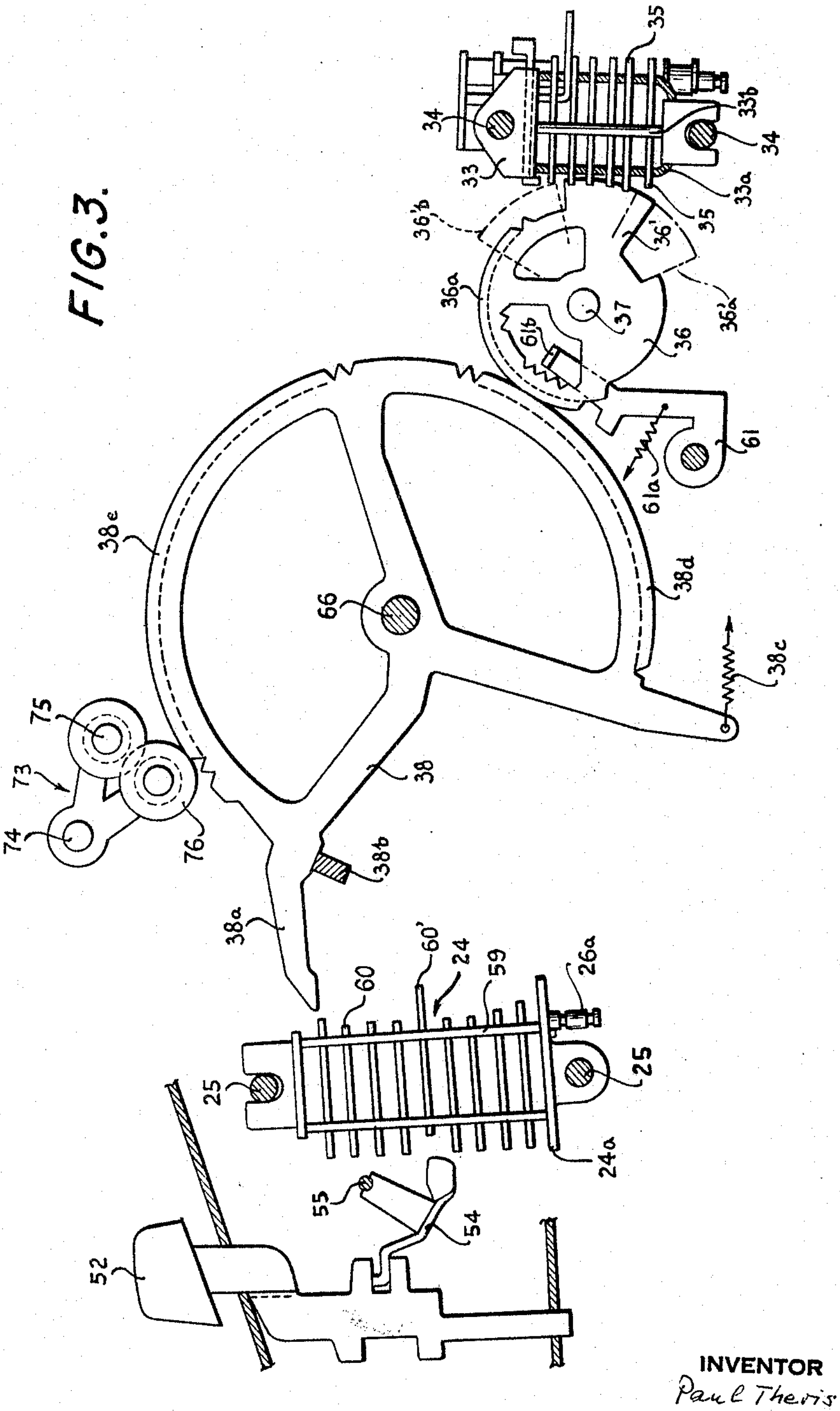
FIG. 3 is a fragmentary side view illustrating parts of a calculator to which the present invention is applied.

Referring now to the drawings, and more particularly to FIG. 3, a digit key 52 of a keyboard turns a member 54 about a shaft 55 for displacing a pin 60′ of an ordinal row of pins 60 in walls 59 of a pin carriage 24 which is mounted on guide rails 25 for movement between ordinal positions. Pin carriage 24 is also shown in FIG. 1, and has a projection 26*a* connected to a spring 26 urging pin carriage 24 to move stepwise toward the left as viewed in FIG. 1.

When the abutment bar 38*b* is lowered at the beginning of an operational cycle, springs 38*c* urge ordinal transfer members 38 to turn in counterclockwise direction to sense pins 60' set in the respective orders of pin carriage 24. Transfer members 38 are turnable about a shaft 66 and have peripheral gear portions 38*d* and 38*e*. Gear portions 38*e* cooperate either with a set of negative ordinal gears 76 or with a set of positive ordinal gears 75 of a register 73 which can be turned about shaft 74.

Gear portions 38*d* cooperate with peripheral gear portions 36*a* of a set of ordinal storage gears 36 of a multiplier register. The ordinal gears 36 are turnable about shaft 37, and have abutment projections 36'. In the zero position of an ordinal gear 36, abutment projection 36' is in the position 36'*a*, and in the position "nine" of the respective ordinal gear 36, in the position 36'*b*.

Shaft 37 is operated in the conventional manner to move the multiplier register 36 between the illustrated transfer position, and a position in which gear portions 36*a* are spaced from gear portions 38*d*. The meshing engagement takes place during the second part of an operational cycle when bar 38*b* moves upward and turns transfer members 38 in clockwise direction so that the ordinal gears 36 are turned corresponding angles to store the multiplier. When the multiplier has thus been transferred from the pin carriage to the multiplier register, the latter is moved away from the transfer members 38. Since the multiplier must remain as a constant value in the multiplier register, the same is locked by locking member 61 under the action of springs 61*a*. Locking member 61 has teeth engaging corresponding notches in cutouts of ordinal gears 36. When the multiplier register is cleared, the locking members 61 are first moved to an inoperative position.

A multiplication carriage 33, see also FIG. 1, has a U-shaped wall 33*a*, and upper and lower portions guided on guide rails 34 for movement in the direction of the axis of shaft 37 of the multiplier register 36. A shaft 33*b* supports a plurality of counter pawls 35 cooperating with the abutment portion 36'. In accordance with the digit entered in the respective ordinal gear 36, a greater or smaller number of counter pawls 35 will cooperate with abutment portion 36' in a manner which is not an object of the present invention.

Referring now to FIG. 1, during the storing of the multiplier in the ordinal gears 36, the multiplication carriage 33 must be in the inoperative position shown in solid lines in order to permit the turning of the ordinal register gears 36. When the multiplier has been entered, multiplication carriage 33 must be moved to the position 33' shown in broken lines in FIG. 1 in which counter pawls 35 abut abutment portion 36'. It is necessary that multiplication carriage 33 is coupled with pin carriage 24 for further movement between a sequence of operative positions in which the multiplicand stored in pin carriage 24, is added as many times as required by the digits of the orders of the multiplier stored in the multiplier register 36.

When a counter pawl 35 is withdrawn to an inoperative position under the control of a counter, not shown, it is turned by a spring, not shown, to a position located behind the abutment portion 36' of the respective ordinal gear 36 in the direction toward the higher orders.

Before the multiplication carriage 33 is coupled with pin carriage 24 for movement together, it must first be moved from position shown in solid lines in FIG. 1 to position 33' so that the two carriages are in the correct relative position.

During this one step movement of the multiplication carriage 33, the pin cariage is in a displaced position according to the multiplicand entered in the same.

At the end of the movement of the connected pin carriage and multiplication carriage, the multiplication carriage must be again moved one step from the position 33' to the position shown in solid lines in FIG. 1 since the multiplication carriage 33 has no drive means of its own. Furthermore, the counter pawls 35, which were twice rocked in clockwise direction as viewed in FIG. 1, must be withdrawn from the ordinal gear 36 of the lowest unit order. Counter pawls 35 are constructed so that they turn about shaft 33*b* against the action of corresponding springs, not shown, and resiliently yield when engaged by abutment portions 36' during movement of multiplication carriage 33.

Figure 2:
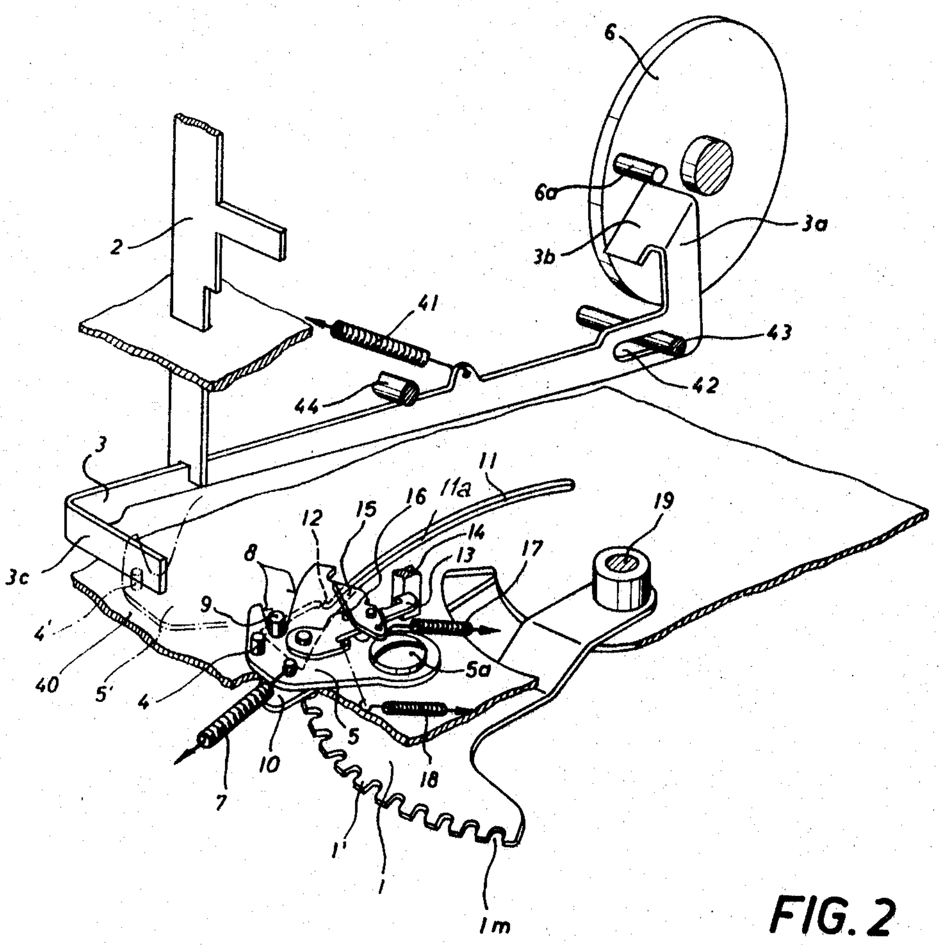
FIG. 2 is a fragmentary perspective view illustrating parts of the embodiment of FIG. 1, other parts being omitted for the sake of clarity and simplicity.

FIGS. 1 and 2 illustrate the coupling arrangement of the invention in an initial position in which the multiplication carriage 33 is in an inoperative position in which counter pawl 35 is spaced one step from the ordinal gear 36 of the lowest order. A multiplicand having four orders is assumed to be entered in pin carriage 24.

Pin carriage 24 has a plate with rack teeth 24*a* meshing with a first gear 22 connected by a hub, not shown, and mounted on shaft 23 with a second gear 22*a* meshing with a peripheral gear segment 21 on a member 20 connected by a hub on a shaft 19 with a coupling member 1 having a peripheral portion 1' formed with coupling recesses 1*a* spaced from each other distances corresponding to steps of pin cariage 24. Since members 1, 20, and also gears 22, 22*a* are freely turnable on shafts 19 and 23, coupling member 1 will move with pin carriage 24 and assume corresponding positions when pin carriage 24 moves step by step between ordinal positions.

As best seen in FIG. 2, coupling member 1 has a bent portion so that the peripheral portion 1' is located below a cover plate 40, while shaft 19 is located above the same. A part-circular slot is provided in cover plate 40 for this purpose.

An actuating member 5 having a guide recess 8, is mounted on a pivot screw 5*a* on support plate 40 and is biased by a spring 7 to turn in counterclockwise direction. A pin 13*a* on actuating member 5 supports a locking member 13 for angular movement. A spring 18 acts on locking member 13 to turn the same in counterclockwise direction until abutting a fixed abutment member 14 on support plate 40. Spring 18 is shown in FIG. 2 spaced from locking member 13 for the sake of clarity.

Locking member 13 carries a pivot pin 15*a* on which a pawl 15 is mounted for angular movement. Pawl 15 is biased by a spring 17 to turn in counterclockwise direction until abutting a stop pin 16 on locking member 13.

Actuating member 5 carries a projecting pin 4 cooperating with a transverse projecting arm 3*c* of a drive lever 3. The actual position of drive lever 3 in relation to the other parts of the device is shown in FIG. 1, while drive lever 2 is shown in a displaced position in FIG. 2, together with actuating member 5 in a displaced position 5' with the displaced projecting pin 4'. FIG. 2 may be considered as an exploded view as far as the position of drive lever 3 is concerned.

Drive lever 3 has a slot 42 through which a supporting shaft 43 passes so that drive lever 3 is supported for turning movement between a position in which the transverse arm 3*c* is located above projecting pin 4, and an operative position in which arm 3*c* and pin 4 are located at the same level. Slot 42 also permits a longitudinal reciprocating movement of drive lever 3 which has another arm 3*a* with a slanted face 3*b* engaged by a pin 6*a* on a rotary disc 6 once during each revolution of disc 6. Rotary disc 6 is driven by the drive means of the machine, and causes a reciprocating longitudinal movement of drive lever 3. A multiplication key 2 has a cutout engaged by drive lever 3 in its upper inoperative position into which it is urged by a spring 41. A stop 44 defines this inoperative position.

When the multiplication key 2 is depressed, drive lever 3 is moved to a lower operative position in which arm 3c engages pin 4 of actuating member 5 and turns the same in clockwise direction from the first position illustrated in FIG. 1 to a second position in which locking projection 13b of locking member 13 snaps behind the abutment member 14 on support plate 40, whereby actuating member 5 is locked in this angularly displaced second position.

The multiplication carriage 33 has a pivot means 30 articulated with an angular lever 28 which is turnable about a pivot 29. A pivot pin 27 connects angular lever 28 with a coupling bar 10 carrying a coupling pin 9 which in the initial position of the apparatus, is located in guide recess 8 of actuating member 5.

Support plate 40 has a guide slot 11 with a shoulder 12 and a wider substantially trapezoid end portion in the region of actuating member 5. In the initial position of the apparatus, coupling pin is located in the wider end portion of guide slot 11, and when actuating member 5 is turned from the illustrated first position to its second position and locked in the second position, coupling pin 9 of coupling member 10 moves in the wider slot portion and is guided by shoulder 12 into the narrow part-circular slot portion 11a which has the center of curvature coinciding with the axis of shaft 19.

While actuating member 5 moves between the first and second positions, coupling means 9, 10, 28 move multiplication carriage 33 from the inoperative position shown in solid lines to the operative position 33′ shown in broken lines in which the counter pawl 35 moves to the position 35′ cooperating with the abutment portion 36′ of the lowest ordinal register gear 36.

When coupling pin 9 has been turned by actuating member 5 along a circular path about the axis of shaft 5a, it is located in one of the coupling recesses 1a of coupling member 1 so that coupling members 10 and 1 and thereby multiplication carriage 33 and pin carriage 24 are coupled to each other for movement together between a plurality of operative positions as required for carrying out a multiplication. While pin carriage 24 moves stepwise, coupling member 1 turns corresponding angular steps and moves coupling pin 9 along the part-circular guide slot portion 11a while the outer curved edge of guide slot portion 11a holds coupling pin 9 in the respective recess of the peripheral portion 1′. The backs of the teeth of peripheral portion 1′ are slanted to facilitate the movement of coupling pin 9 into the coupling recesses of coupling member 1.

At the beginning of an operation, the multiplier is already transferred into the multiplication register 36, the multiplication slide is in the inoperative position shown in solid lines in FIG. 1 permitting the entry of the multiplier into the multiplication register, and the pin carriage 24 has moved four steps. Consequently, coupling member 1 has been turned a corresponding angle, and the fourth coupling recess of the coupling recesses 1a to 1m is located on the circular path of coupling pin 9 which has its center in the axis of pivot screw 5a.

Multiplication key 2 is depressed so that drive lever 3 is moved from its higher inoperative position to its lower operative position cooperating with pin 4, as best seen in FIG. 1.

Rotation of disc 6 causes drive lever 3 to move to the right as viewed in FIG. 2, and to engage pin 4 whereby actuating member 5 is turned about pivot screw 5a against the action of spring 7.

Actuating member 5 moving from its first position to its second position, moves coupling pin 9 along a circular path about the axis of pivot screw 5a to a position located in the fourth coupling recess of coupling member 1. During such movement, the shoulder 12 of guide slot 11 helps to guide coupling pin 9 into the desired position in which coupling pin 9 is located in a coupling recess to couple the first coupling member 10 with the second coupling member 1.

During such movement of the coupling pin 9, coupling member 10 is displaced substantially in longitudinal direction thereof, while angular lever 28 performs a rocking movement and multiplication carriage 33 is moved from its initial inoperative position to the operative position 33′ cooperating with the multiplication register 36.

Guide recess 8 of actuating member 5 extends in the second position of actuating member substantially in tangential direction of the peripheral portion 1′.

From the above description of the first part of the operation, it will become apparent that actuating means 2, 3, 4, 5, 6 are movable between first and second positions for moving the coupling means 9, 10, 1′, 1 between a disengaged position and an engaged position in which carriages 33 and 24 are connected and coupled to each other in operative positions. More particularly, the first coupling member 10, 9, is moved by the actuating means between a position disengaged from coupling member 1, 1′, and a position engaged with the same.

When coupling pin 9 is placed in the respective coupling recess 1a to 1m, actuating member 5 is in the second position in which locking member 13 has moved so far that its locking projection 13b snaps behind abutment member 14 on support plate 40. Consequently, actuating member 5 is locked in its second position. Coupling pin 9 engages release pawl 15 and turns the same in clockwise direction against the action of spring 15a.

Multiplication carriage 33 and pin carriage 24 move now together between a sequence of operative positions, while coupling pin 9 and the respective coupling recess of coupling member 1 move along the narrow slot portion 11a whereby coupling pin 9 is held in the respective coupling recess by the outer edge of guide slot 11.

When the necessary calculating operations have been completed, and the carriages 24 and 33 are together returned to the initial positions in a movement toward the right as viewed in FIG. 1, coupling member 10 with coupling pin 9 moves together with carriage 33, and coupling pin 4 moves in guide slot 11a until again arriving in recess 8 of actuating member 5 which remained in a position directly on guide slot 11 since it was locked by locking means 13, 14. When coupling pin 9 is at the bottom of recess 8, it engages a slanted face 15b of release pawl 13 urging the same to turn in counterclockwise direction, but since release pawl abuts stop pin 16 of locking member 13, the latter is turned in clockwise direction so that locking projection 13b releases abutment member 14 whereby actuating member 5 is unlocked so that spring 7 turns actuating member 5 back to its initial position illustrated in FIG. 1, while coupling pin 9 is moved out of the previously engaged coupling recess of coupling member 1 and assumes again the position illustrated in FIG. 1.

During such movement of coupling pin 9, coupling member 10 is shifted and causes shifting of multiplication carriage 33 from the operative position 33′ to the inoperative position shown in solid lines in FIG. 1.

Since coupling pin 9 is no longer located in a coupling recess of coupling member 1, pin carriage 24 is no longer coupled to multiplication carriage 33, and can be moved to its position of rest, which requires four steps in the example illustrated in FIG. 1 in which a multiplicand having four orders was assumed to be stored in the pin carriage, corresponding to the fourth coupling recess engaged by coupling pin 9.

It will be understood that each of the elements described above, or two or more together, may also find a useful application in other types of calculators differing from the types described above.

While the invention has been illustrated and described as embodied in a coupling arrangement for coupling a pin carriage with a multiplication carriage during a multiplication operation of a calculator, and permitting shifting of the multiplication carriage from an inoperative position to an operative position while the pin carriage remains in the same position, it is not intended to be limited to the details shown, since various modifications and structural changes may be made without departing in any way from the spirit of the present invention.

Without further analysis, the foregoing will so fully reveal the gist of the present invention that others can by applying current knowledge readily adapt it for various applications without omitting features that, from the standpoint of prior art, fairly constitute essential characteristics of the generic or specific aspects of this invention and, therefore, such adaptations should and are intended to be comprehended within the meaning and range of equivalence of the following claims.

What is claimed as new and desired to be secured by Letters Patent is:

1. In a calculator, in combination, a carriage coupling arrangement comprising first carriage means movable between an inoperative position and a sequence of operative positions; second carriage means movable between a sequence of operative positions; coupling means connected with said first carriage means for movement and being in a disengaged position and in an engaged position when said first carriage means is in said inoperative position, and in one of said operative positions, respectively, said coupling means in said engaged position connecting said first and second carriage means for movement together; and actuating means movable between first and second positions for moving said coupling means between said disengaged and engaged positions so that said first carriage means is moved from said inoperative position to said one operative position and back while said second carriage means remains in the same operative position, and so that said first and second carriage means are coupled to each other for movement together between said operative positions.

2. In a calculator, in combination, a carriage coupling arrangement comprising first carriage means movable between an inoperative position and a sequence of operative positions; second carriage means movable between a sequence of operative positions; coupling means connected with said first carriage means for movement and being in a disengaged position and in an engaged position when said first carriage means is in said inoperative position, and in one of said operative positions, respectively, said coupling means in said engaged position connecting said first and second carriage means for movement together; actuating means movable between first and second positions for moving said coupling means between said disengaged and engaged positions so that said first carriage means is moved from said inoperative position to said one operative position and back while said second carriage means remains in the same operative position, and so that said first and second carriage means are coupled to each other for movement together between said operative positions; and guide means for guiding and holding said coupling means in said engaged position during movement of said first and second carriage means between said operative positions.

3. In a calculator, in combination, a carriage coupling arrangement comprising first carriage means movable between an inoperative position and a sequence of operative positions; second carriage means movable between a sequence of operative positions; coupling means connected with said first carriage means for movement and being in a disengaged position and in an engaged position when said first carriage means is in said inoperative position, and in one of said operative positions, respectively, said coupling means in said engaged position connecting said first and second carriage means for movement together; and actuating means including a key, reciprocable drive means, and an actuating member operatively connected to said drive means upopn actuation of said key so as to be moved by said drive means from a first position to a second position for moving said coupling means between said disengaged and engaged positions so that said first carriage means is moved from said inoperative position to said one operative position and back while said second carriage means remains in the same operative position, and so that said first and second carriage means are coupled to each other for movement together between said operative positions.

4. In a calculator, in combination, a carriage coupling arrangement comprising first carriage means movable between an inoperative position and a sequence of operative positions; second carriage means movable between a sequence of operative positions; coupling means connected with said first carriage means for movement and being in a disengaged position and in an engaged position when said first carriage means is in said inoperative position, and in one of said operative positions, respectively, said coupling means in said engaged position connecting said first and second carriage means for movement together; actuating means including a key, reciprocable drive means, and an actuating member operatively connected to said drive means upon actuating of said key so as to be moved by said drive means from a first position to a second position for moving said coupling means between said disengaged and engaged positions so that said first carriage means is moved from said inoperative position to said one operative position and back while said second carriage means remains in the same operative position, and so that said first and second carriage means are coupled to each other for movement together between said operative positions; and locking means including a locking member mounted on said actuating member for movement between an inoperative position and a locking position, and an abutment engaged by said locking member in said locking position for locking said actuating member in said second position.

5. In a calculator, in combination, a carriage coupling arrangement comprising first carriage means movable between an inoperative position and a sequence of operative positions; second carriage means movable between a sequence of operative positions; coupling means including a first coupling member connected with said first carriage means for movement therewith, and a second coupling member connected with said second carriage means for movement therewith, said coupling members being in a disengaged position and in an engaged position when said first carriage means is in said inoperative position, and in one of said operative positions, respectively, said coupling members in said engaged position connecting said first and second carriage means for movement together; and actuating means movable between first and second positions for moving said first coupling member between said disengaged and engaged positions so that said first carriage means is moved from said inoperative position to said one operative position and back while said second carriage means remains in the same operative position, and so that said first and second carriage means are coupled to each other for movement together between said operative positions.

6. In a calculator, in combination, a carriage coupling arrangement comprising first carriage means movable between an inoperative position and a sequence of operative positions; second carriage means movable between a sequence of operative positions; coupling means including a first coupling member connected with said first carriage means for movement therewith, and a second coupling member connected with said second carriage means for movement therewith, said coupling members being in a disengaged position and in an engaged position when said first carriage means is in said inoperative position, and in one of said operative positions, respectively, said coupling members in said engaged position connecting said first and second carriage means for movement together; and actuating means including a key, reciprocable drive means, and an actuating member mounted for turning movement and operatively connected to said drive means upon actuation of said key so as to be moved by said drive means from a first position to a second position for moving said first coupling member between said disengaged and engaged positions so that said first carriage means is moved from said inoperative position to said one operative position and back while said second carriage means remains in the same operative position, and so that said first and second carriage means are coupled to each other for movement together between said operative positions.

7. In a calculator, in combination, a carriage coupling arrangement comprising first carriage means movable between an inoperative position and a sequence of operative positions; second carriage means movable between a sequence of operative positions; coupling means including a first coupling member connected with said first carriage means for movement therewith, and a second coupling member connected with said second carriage means for movement therewith, said coupling members being in a disengaged position and in an engaged position when said first carriage means is in said inoperative position, and in one of said operative positions, respectively, said coupling members in said engaged position connecting said first and second carriage means for movement together; and actuating means movable between first and second positions for moving said first coupling member between said disengaged and engaged positions so that said first carriage means is moved from said inoperative position to said one operative position and back while said second carriage means remains in the same operative position, and so that said first and second carriage means are coupled to each other for movement together between said operative positions; locking means mounted on said actuating member for movement between an inoperative position, and a locking position for locking said actuating member in said second position after said coupling members are in said engaged position; and means for releasing said locking means when said first coupling member moves from said engaged to said disengaged position.

8. In a calculator, in combination, a carriage coupling arrangement comprising first carriage means movable between an inoperative position and a sequence of operative positions; second carriage means movable between a sequence of operative positions; coupling means including a first coupling member connected with said first carriage means for movement therewith, and a second coupling member connected with said second carriage means for movement therewith, said coupling members being in a disengaged position and in an engaged position when said first carriage means is in said inoperative position, and in one of said operative positions, respectively, said coupling members in said engaged position connecting said first and second carriage means for movement together; and actuating means including a key, reciprocable drive means, and an actuating member mounted for turning movement and operatively connected to said drive means upon actuation of said key so as to be moved by said drive means from a first position to a second position for moving said first coupling member between said disengaged and engaged positions so that said first carriage means is moved from said inoperative position to said one operative position and back while said second carriage means remains in the same operative position, and so that said first and second carriage means are coupled to each other for movement together between said operative positions, said actuating means including a spring connected to said actuating member for urging the same to move from said second position to said first position for returning said first coupling member to said disengaged position.

9. In a calculator, in combination, a carriage coupling arrangement comprising first carriage means movable between an inoperative position and a sequence of operative positions; second carriage means movable between a sequence of operative positions; coupling means including a first coupling member connected with said first carriage means for movement therewith, and a second coupling member connected with said second carriage means for movement therewith, said coupling members being in a disengaged position and in an engaged position when said first carriage means is in said inoperative position, and in one of said operative positions, respectively, said coupling members in said engaged position connecting said first and second carriage means for movement together; and actuating means including a key movable between a normal position and an actuated position, a driven rotary cam, a reciprocable lever reciprocated by said cam and being connected with said key to be shifted by the same between an inoperative position and an operative position, and an actuating member mounted for turning movement and having a projection located in the path of movement of said lever in said operative position so as to be moved by said lever from a first position to a second position for moving said first coupling member between said disengaged and engaged positions so that said first carriage means is moved from said inoperative position to said one operative position and back while said second carriage means remains in the same operative position, and so that said first and second carriage means are coupled to each other for movement together between said operative positions, said actuating means including a spring connected to said actuating member for urging the same to move from said second position to said first position for returning said first coupling member to said disengaged position.

10. In a calculator, in combination, a carriage coupling arrangement comprising first carriage means movable between an inoperative position and a sequence of operative positions; second carriage means movable between a sequence of operative positions; coupling means including a first coupling member connected with said first carriage means for movement therewith, and a second coupling member connected with said second carriage means for movement therewith, said coupling members being in a disengaged position and in an engaged position when said first carriage means is in said inoperative position, and in one of said operative positions, respectively, said coupling members in said engaged position connecting said first and second carriage means for movement together; and actuating means including a key, reciprocable drive means, and an actuating member mounted for turning movement and operatively connected to said drive means upon actuating of said key so as to be moved by said drive means from a first position to a second position for moving said first coupling member between said disengaged and engaged positions so that said first carriage means is moved from said inoperative position to said operative position and back while said second carriage means remains in the same operative position, and so that said first and second carriage means are coupled to each other for movement together between said operative positions, locking means including a locking lever mounted on said actuating member for turning movement between an inoperative position and a locking position, a locking abutment engaged by said locking lever in said locking position, and a release member mounted on said locking lever, said locking lever in said locking position locking said actuating member when said first and second coupling members are in said engaged position, and said release member being operated by said first coupling member moving from said engaged position to said disengaged position to move said locking lever to said inoperative position.

11. In a calculator, in combination, a carriage coupling arrangement comprising a register; a multiplication carriage movable between an inoperative position spaced from said register and a sequence of operative positions connected with said register for movement therewith; a pin carriage movable between a sequence of operative positions; a first coupling member connected with said multiplication carriage for movement therewith and having a coupling pin; a support; a second coupling member mounted on said support and connected with said pin carriage for movement therewith and having a series of coupling recesses cooperating with said coupling pin in said operative positions of said pin carriage; an actuating member mounted on said support for movement between first and second positions and having a guide recess receiving said coupling pin in said inoperative position of said multiplication carriage for holding in said first position said coupling pin spaced from said coupling recesses and for placing in said second position said coupling pin in one of said coupling recesses, said actuating member shifting said first coupling member, and thereby said multiplication carriage from said inoperative position to the first of said operative positions when moving from said first position to said second position so that said carriages are connected for movement together in said operative positions; reciprocating drive means having an inoperative position and an operative position for moving said actuating member from said first and to said second position thereof; and a key for moving said drive means to said operative position whereby said actuating member is moved by said drive means from said first position to said second position and said multiplication carriage is moved to said first operative position while said pin carriage remains in the same operative position and is coupled with said multiplication carriage for movement between said operative positions.

12. In a calculator, in combination, a carriage coupling arrangement comprising a register; a multiplication carriage movable between an inoperative position spaced from said register and a sequence of operative positions connected with said register for movement therewith; a pin carriage movable between a sequence of operative positions; a first coupling member connected with said multiplication carriage for movement therewith and having a coupling pin; a support; a second coupling member mounted on said support and connected with said pin carriage for movement therewith and having a series of coupling recesses cooperating with said coupling pin in said operative positions of said pin carriage; an actuating member mounted on said support for movement between first and second positions and having a guide recess receiving said coupling pin in said inoperative position of said multiplication carriage for holding in said first position said coupling pin spaced from said coupling recesses and for placing in said second position said coupling pin on one of said coupling recesses, said actuating member shifting said first coupling member, and thereby said multiplication carriage from said inoperative position to the first of said operative positions when moving from said first position to said second position so that said carriages are connected for movement together in said operative positions; locking means mounted on said actuating member and engaging said support in said second position of said actuating member to lock said actuating member in said second position so that said coupling pin moves out of said guide recess during movement of said carriages between said operative positions; reciprocating drive means having an inoperative position, and an operative position for moving said actuating member from said first and to said second position thereof; and a key for moving said drive means to said operative position whereby said actuating member is moved by said drive means from said first position to said second position and said multiplication carriage is moved to said first operative position while said pin carriage remains in the same operative position and is coupled with said multiplication carriage for movement between said operative positions.

13. In a calculator, in combination, a carriage coupling arrangement comprising a register; a multiplication carriage movable between an inoperative position spaced from said register and a sequence of operative positions connected with said register for movement therewith; a pin carriage movable between a sequence of operative positions; a first coupling member connected with said multiplication carriage for movement therewith and having a coupling pin; a support; a second coupling member mounted on said support and connected with said pin carriage for movement therewith and having a series of coupling recesses cooperating with said coupling pin in said operative positions of said pin carriage; an actuating member mounted on said support for movement between first and second positions and having a guide recess receiving said coupling pin in said inoperative position of said multiplication carriage for holding in said first position said coupling pin spaced from said coupling recesses and for placing in said second position said coupling pin in one of said coupling recesses, said actuating member shifting said first coupling member, and thereby said multiplication carriage from said inoperative position to the first of said operative positions when moving from said first position to said second position so that said carriages are connected for movement together in said operative positions; locking means mounted on said actuating member and engaging said support in said second position of said actuating member to lock said actuating member in said second position so that said coupling pin moves out of said guide recess during movement of said carriages between said operative positions; guide slot means on said support for guiding said coupling pin during movement of said second coupling member with said pin carriage so that said coupling pin is held in the respective coupling recess of said second coupling member; reciprocating drive means having an inoperative position, and an operative position for moving said actuating member from said first and to said second position thereof; and a key for moving said drive means to said operative position whereby said actuating member is moved by said drive means from said first position to said second position and said multiplication carriage is moved to said first operative position while said pin carriage remains in the same operative position and is coupled with said multiplication carriage for movement between said operative positions.

14. An apparatus as set forth in claim 13 wherein said second coupling member is mounted on said support for turning movement about an axis, wherein said coupling recesses are disposed along a circular peripheral portion of said second coupling member concentric with said axis, wherein said guide slot means have a part-circular guide slot portion concentric with said axis, and wherein said guide recess is substantially aligned with said guide slot portion in said second locked position of said actuating member.

15. An apparatus as set forth in claim 12 wherein said locking means include a locking lever mounted for turning movement on said actuating member, an abutment member on said support, and a release pawl turnably mounted on said locking member and abutting the latter so as to be turnable only in one direction by said coupling means moving with said actuating member from said first position to said second position, said coupling pin engaging said release pawl and urging the same against said locking member to move the latter to a position releasing said abutment when said carriages are returned whereby said coupling pin turns and releases actuating member from said second position to said first position while said multiplication carriage moves from said first operative position to said inoperative position.

16. An apparatus as set forth in claim 15 and including a first spring urging said actuating member to move to said first position, a second spring urging said locking member to turn to a locking position, and a third spring connected to said release pawl and urging the same to abut said locking member.

17. An apparatus as set forth in claim 12 wherein said pin carriage has a rack portion, and including gear means connecting said second coupling member with said rack portion, said second coupling member being mounted for turning movement of said support and assuming a plurality of angularly displaced ordinal positions when said pin carriage is in different ordinal positions, said coupling recesses being spaced from each other distances corresponding to steps of said second coupling member between said ordinal positions.

18. An apparatus as set forth in claim 17 wherein said second coupling member has projections between said coupling recesses, the backs of said projections being slanted to facilitate the movement of said coupling pin into any one of said coupling recesses.

19. An apparatus as set forth in claim 12 wherein said reciprocating drive means including a drive lever mounted for turning and reciprocating longitudinal movement, and being turnable between said inoperative and operative positions by said key; and including rotary cam means for reciprocating said drive lever in said operative position; and wherein said actuating member carries a projecting pin located opposite said drive lever in said operative position and being engaged by the same during reciprocation of the same whereby said actuating member is moved from said first position to said second position.

20. An apparatus as set forth in claim 12 wherein said support includes a guide means for guiding said coupling pin into a coupling recess during movement of said actuating member from the first position to said second position, and for holding said coupling pin in the respective coupling recess during movement of said second coupling member with said pin carriage between said operative positions.

References Cited by the Examiner

UNITED STATES PATENTS

| | | | |
|---|---|---|---|
| 2,905,382 | 9/1959 | Carnicina | 235—60 |
| 3,024,975 | 3/1962 | Sundstrand | 235—60 |

RICHARD B. WILKINSON, *Primary Examiner.*

S. A. WAL, *Assistant Examiner.*